United States Patent
Price

[19]

[11] Patent Number: 5,548,956
[45] Date of Patent: Aug. 27, 1996

[54] CABLE RESTRAINED RECIPROCATING BLADE SYSTEM FOR ENERGY EXTRACTION FROM MOVING BODY OF WATER

[76] Inventor: Daniel T. Price, 60 Corona, No. 18, Denver, Colo. 80218-3877

[21] Appl. No.: 480,644

[22] Filed: Jun. 7, 1995

[51] Int. Cl.$^6$ .............................. F16D 31/02; F03B 13/12
[52] U.S. Cl. ................... 60/369; 60/398; 415/3.1
[58] Field of Search ................. 60/369, 398; 415/3.1, 415/2.1, 905, 906

[56] References Cited

U.S. PATENT DOCUMENTS

| | | | |
|---|---|---|---|
| 827,889 | 8/1906 | Smith . | |
| 830,973 | 9/1906 | DeCamp | 60/398 |
| 984,266 | 2/1911 | Doney | 60/721 |
| 1,000,351 | 8/1911 | Symons et al. | 416/68 |
| 3,978,345 | 8/1976 | Bailey . | |
| 3,995,972 | 12/1976 | Nassar | 415/2.1 X |
| 4,303,834 | 12/1981 | Li | 415/2.1 |
| 4,470,770 | 9/1984 | Grose . | |
| 4,525,122 | 6/1985 | Krnac . | |

FOREIGN PATENT DOCUMENTS

| | | | |
|---|---|---|---|
| 2311941 | 12/1976 | Germany | 60/398 |
| 88-286437/41 | 5/1988 | Germany | 415/2.1 |
| 93-176549 | 5/1993 | Germany | 415/905 |
| 93-235972/30 | 7/1993 | Germany | 415/906 |
| 94-232557/28 | 4/1993 | U.S.S.R. | 415/906 |

*Primary Examiner*—John E. Ryznic
*Attorney, Agent, or Firm*—John R. Flanagan

[57] ABSTRACT

A cable restrained reciprocating blade system is adapted for extracting energy from a moving body of water to facilitate conversion to electric energy. In an exemplary embodiment, the system includes a blade placed in a moving body of water and having a hydrofoil configuration adapting it to undergo lateral movement in response to contact with the moving body of water, a control cable attached to an upstream end of the blade and applying a condition of tension to the blade, a pair of power cables attached at first ends to a downstream end of the blade and extending in generally transverse relationship to the direction of flow of the moving body of water and in opposite directions from blade, and a load mechanism connected to second ends of the power cables for alternately applying conditions of tension and slack thereto so as to orient the blade at an angle of attack that causes the blade to undergo lateral movement through an oscillatory path extending generally transverse to the direction of flow of the moving body of water and thereby extract energy from the moving body of water. The load mechanism also is operable to cause the blade upon reaching the respective opposite ends of the oscillatory path to reverse the orientation of the angle of attack of the blade relative to the given flow direction so that the blade will then respond to the moving body of water and initiate movement in the opposite direction along the oscillatory path.

23 Claims, 5 Drawing Sheets

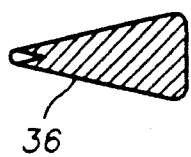
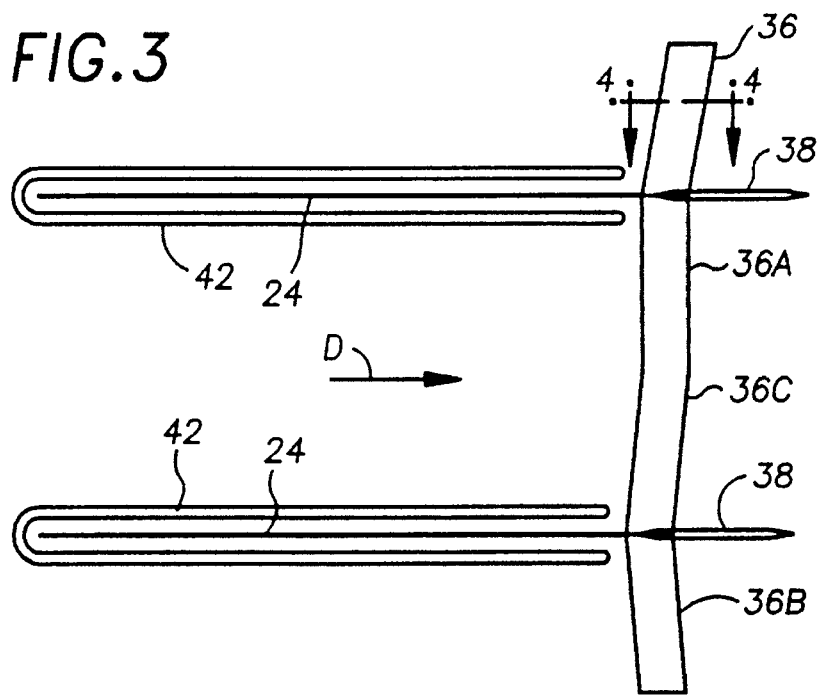
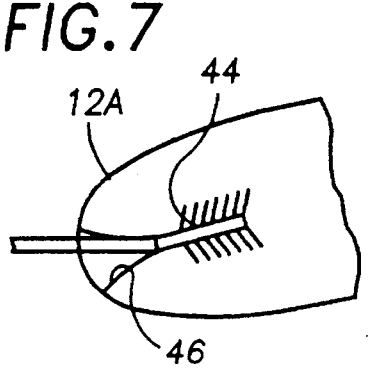
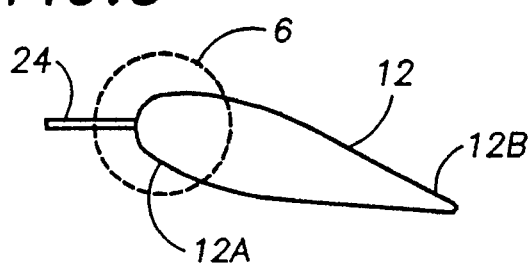
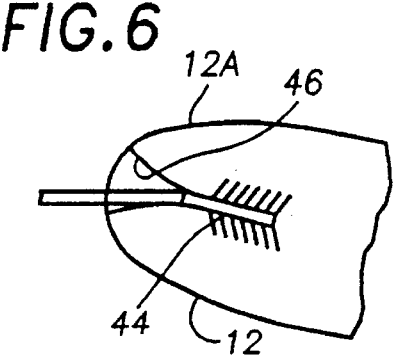

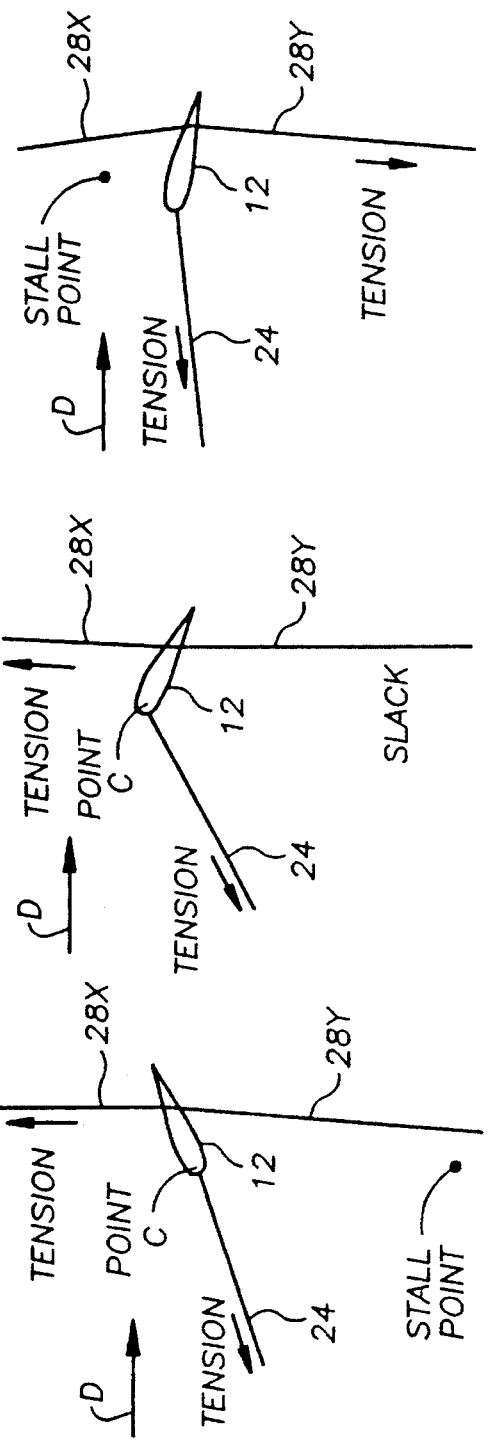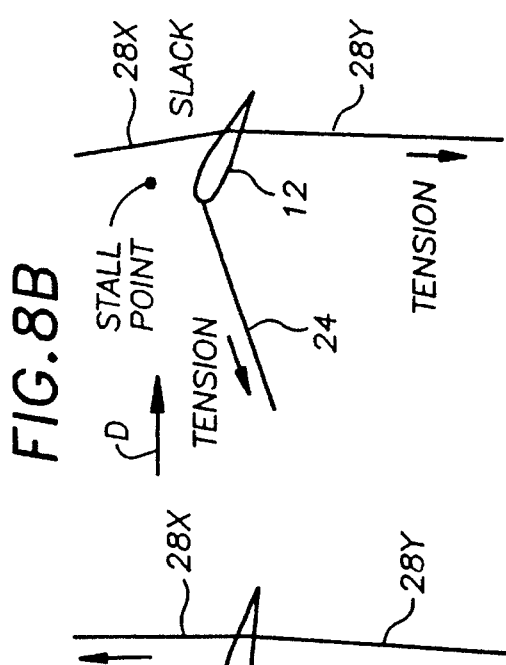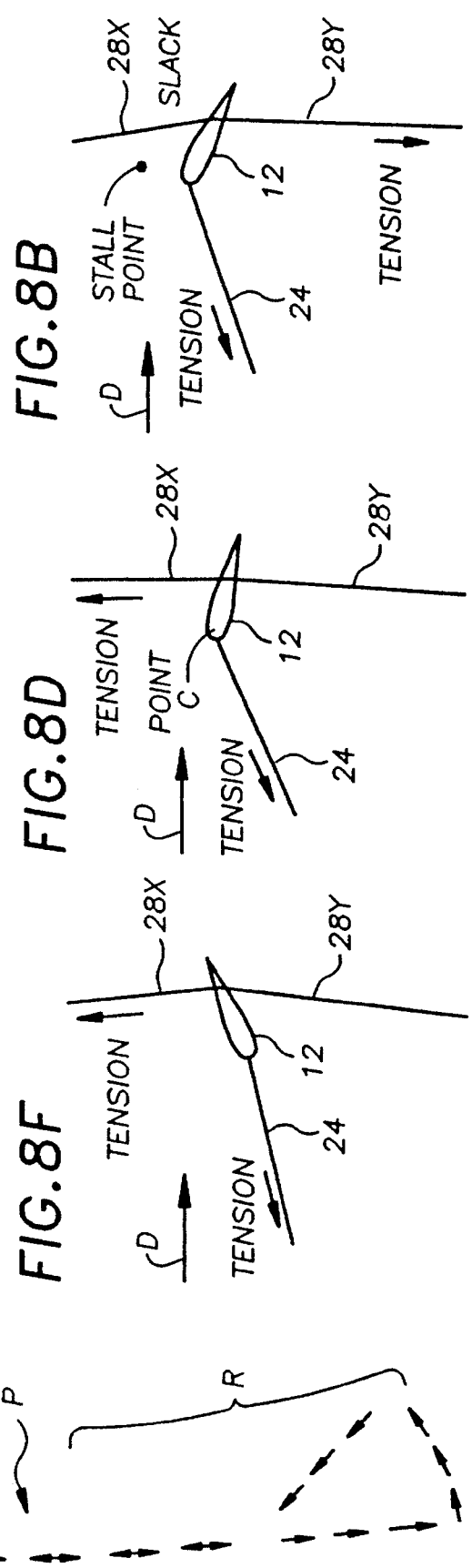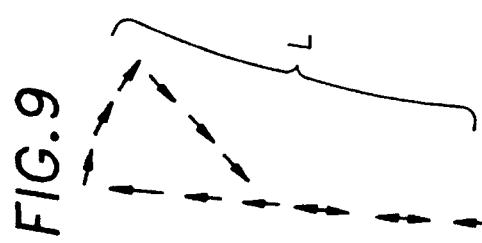

5,548,956

CABLE RESTRAINED RECIPROCATING BLADE SYSTEM FOR ENERGY EXTRACTION FROM MOVING BODY OF WATER

BACKGROUND OF THE INVENTION

1. Field of the Invention

The present invention generally relates to generation of electrical power and, more particularly, is concerned with a cable restrained reciprocating blade system for energy extraction for a moving body of water for facilitating conversion to electric energy.

2. Description of the Prior Art

Since the age of electrification, the hydropower industry has been based on the concept of a rotary turbine directly connected to an electrical generator. The simplicity of this concept and the availability of a large number of suitable damming sites has greatly contributed to the widespread adoption of this concept.

However, the widespread adoption of this concept has required construction of many dams, installation of turbine systems, and construction of networks of long transmission lines at high capital costs and with adverse environmental impacts. Some type of pressure containing device, such as dams, and the passing of pressurized water over a rotary turbine are required. Dams can account for up to 80% of the development costs of a particular site.

The adverse: environmental impacts caused by dams include increased predation, temperature effects, habitat destruction, and delayed progress of migrating fish. These adverse environmental impacts primarily are a consequence of the high head height of dams. The adverse environmental impacts caused by rotary turbine systems which result in mechanical damage to fish include pressure effects, mechanical strike by blades, water shear, and concentration of predators.

An alternative approach to using conventional hydropower to produce electricity which would lower costs and eliminate or, at least, mitigate most environmental effects would be highly desirable. One alternative approach is application of reciprocating mechanisms to energy conversion. Heretofore, this approach has taken the form of developments based on wind energy conversion. Reciprocating mechanism utilizing wind energy have not proved to be viable. Lack of wind energy production is believed due to the low density and low speed of the fluid.

Consequently, a need still exists for another approach to reciprocating energy conversion that overcomes the problems associated with conventional hydropower and avoids the lack of viability of reciprocating wind energy conversion.

SUMMARY OF THE INVENTION

The present invention provides a cable restrained reciprocating blade system designed to satisfy the aforementioned need. The reciprocating blade system provides an approach to energy extraction from a moving body of water that facilitates conversion to electric energy while minimizing costs and environmental impacts. The system utilizes primarily cables and blades as the fundamental elements to convert hydraulic energy into usable mechanical energy.

The reciprocating blade system eliminates the need for large dams, allows for locating the system at existing waterworks facilities, and allows for minimizing long transmission lines. The system can be constructed in very large sizes compared to conventional turbines, and are able to make economical use of large slow moving flow fields. Since the system is a velocity head device, it can be applied without the use of dams locating at existing low water dams, jetties, and sites where a channel narrows naturally and the flow speed increases. The system is ideally suited for extraction of energy from low head resources like those envisioned for velocity head applications, the reason for this suitablity is the use of cables (members primarily in tension). Cables can be rigid members that are shaped to minimize friction in the water. This siting flexibility will result in very low costs for certain sites where man-made structures are already present. Also, the system can be completely floating in a river thereby minimizing costs for structural support. The floating elements would be the cables, the load means and the control means which are defined below. Only the turbine-generator set would be located on-shore. Also, the worldwide economic potential of low head power production is very large. In many cases the largest rivers are also where large populations reside.

Also, the reciprocating blade system can be constructed for a lower cost and produce power which can sell for a higher price than conventional hydroelectric energy. The civil construction costs of the system will be significantly lower than conventional turbines due to the use of velocity head in addition to static head. Because dams are not required, the system can be located near urban centers, which minimizes transmission costs. Also, because the system uses an intermediate hydraulic step, peaking power can be added to the same site without the need for redundant generators or large storage reservoirs. Power from such a system would currently sell for a price as much as twice the current hydroelectric energy prices in the U.S. Thus, the system offers the dual benefits of increased revenues and decreased capital costs. Providing peaking power will also allow construction of a larger plant than that of a site comprising only hydroelectric energy production, thereby maximizing the size of the plant and maximizing the revenue generated at each site. Higher generation rate at a given site can decrease the capital costs per unit power output.

Due to the minimal requirements of the system for use of dams, the reciprocating blade system largely avoids the ecological impacts caused by constructing a dam. The system can be sited close to urban centers, thus avoiding the environmental impacts of building transmission lines. It appears that a slow stroking (low shear rate) and open channel (no pressure changes) design would result in very low fish mortality.

Accordingly, the present invention is broadly directed to a reciprocating blade system for extracting energy from a moving body of water to facilitate conversion thereof to another form of energy, such as electricity. The reciprocating blade system comprises: (a) at least one blade for placement in a moving body of water flowing in a Given flow direction, the blade having a hydrofoil configuration capable of being oriented at an angle of attack relative to the given flow direction to cause the blade to undergo lateral movement in response to contact with the moving body of water; (b) control means attached to an upstream end of the blade with reference to the given flow direction for applying a condition of tension to the upstream end of the blade; (c) power means attached to a downstream end of the blade with reference to the given flow direction and extending in generally transverse relationship to the given flow direction and in opposite directions from the blade; and (d) load means attached to the power means and being operable for alternately applying conditions of tension and slack thereto so as to cause the blade, depending upon the orientation of the angle of attack of the blade to the given flow direction, to respond to the moving body of water and undergo lateral movement through one of a pair of opposite directions along an oscillatory path extending in generally transverse relationship to the given flow direction and thereby extract energy from the moving body of water, and also to cause the blade upon reaching the respective opposite ends of the oscillatory path to reverse the orientation of the angle of attack of the blade relative to the given flow direction so that the blade will then respond to the moving body of water and initiate movement in the opposite direction along the oscillatory path, the load means also being connected to the control means to control the condition of tension in the control means as a function of the position of the blade along its oscillatory path.

Also, the load means is adapted to operate through a working cycle in response to lateral movement of the blade through its oscillatory path. The load means also is adapted to be coupled to an external mechanism for energy conversion which is adapted to operate through an energy conversion cycle in response to operation of the load means through the working cycle. Therefore, the lateral movement of the blade causes the load means in conjunction with the energy conversion mechanism to convert the extracted energy to a more useful form of energy, such as electricity where the external mechanism is a turbine/generator set. The load means also is adapted to do other useful work such as pumping water, hydrocarbons, air or some other fluid.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is an enlarged detailed view of a blade of the reciprocating blade system.

FIG. 4 is an enlarged cross-sectional view of the blade taken along 4—4 of FIG. 3.

FIG. 5 is an enlarged view of the blade and one of the cables of the reciprocating blade system.

FIG. 6 is an enlarged detailed view of the portions of the blade and cable contained in circle 6 of FIG. 5.

FIG. 7 is another view similar to that of FIG. 6 but showing the cable at a different position relative to the blade.

FIGS. 8A through 8F are a sequence of diagrams showing a succession of blade positions as the blade reverses its angle of attack and lateral direction of movement at each end of its oscillatory path.

FIG. 9 is a diagram using arrows to trace direction of movement of central point on the blade along the oscillatory path of the blade.

DETAILED DESCRIPTION OF THE INVENTION

Figure 1:
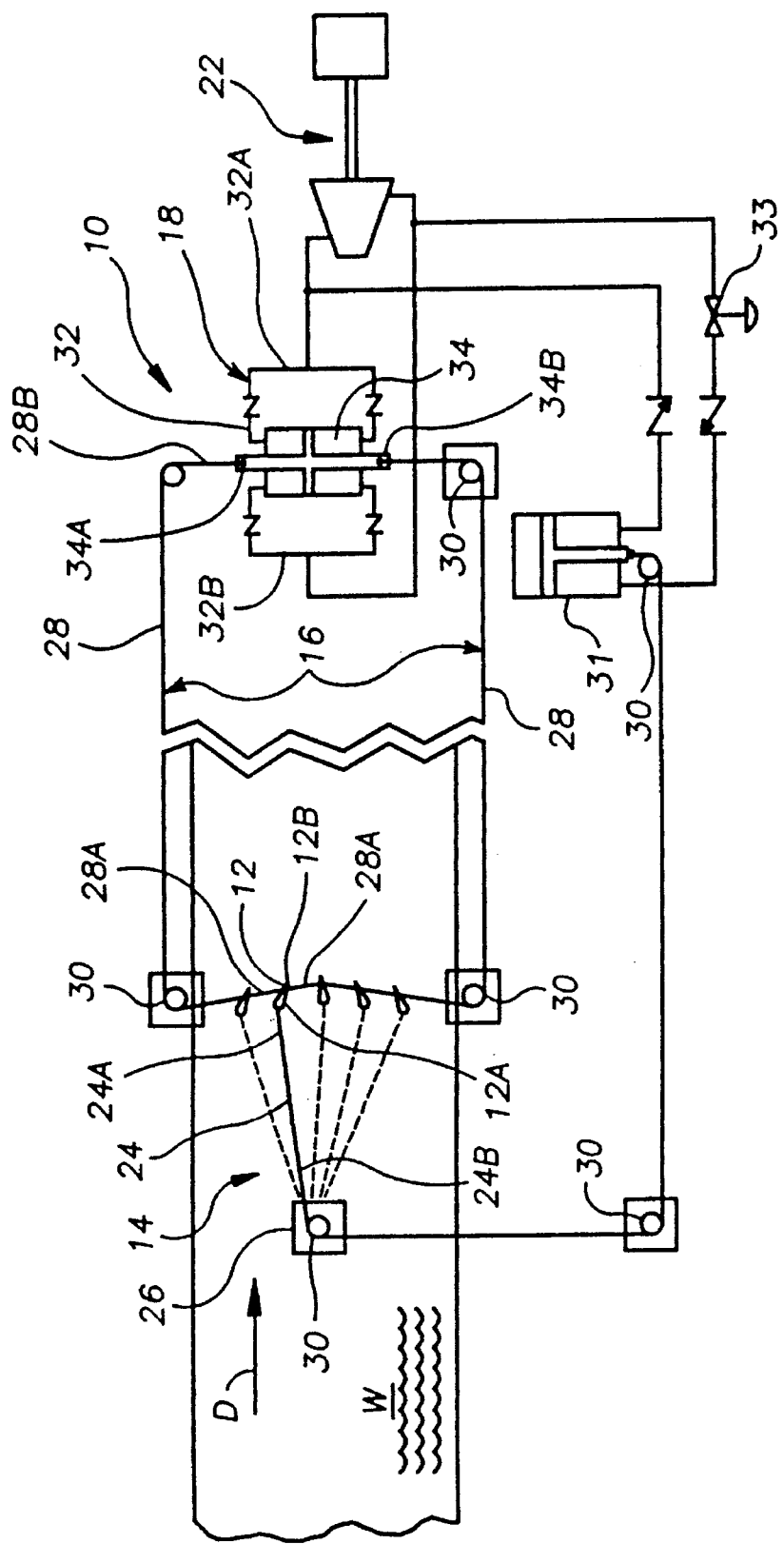
FIG. 1 is a diagram of a simplified version of a cable restrained reciprocating blade system of the present invention employing a single oscillatory blade and a single load mechanism being connected to a turbine/generator set.

Referring to the drawings, and particularly to FIG. 1, there is illustrated a simplified version of a cable restrained reciprocating blade system of the present invention, generally designated 10, for extracting energy from a moving body of water W flowing in a given flow direction D to facilitate conversion thereof to another form of energy, such as electricity. For the sake of brevity, the present invention will hereafter be referred to as the reciprocating blade system 10.

Basically, the reciprocating blade system 10 includes at least one blade 12 placed in the moving body of water W flowing in the given flow direction D, control means 14 attached to an upstream end 12A of the blade 12 with reference to the given flow direction D, power means 16 attached to a downstream end 12B of the blade 12 with reference to the given flow direction D, and load means 18 connected to the power means 16 and, optionally, to the control means 14. The blade 12 of the system 10 has a hydrofoil configuration capable of being oriented at an angle of attack relative to the given flow direction D to cause the blade to undergo lateral movement in response to contact with the moving body of water W.

Figure 2:
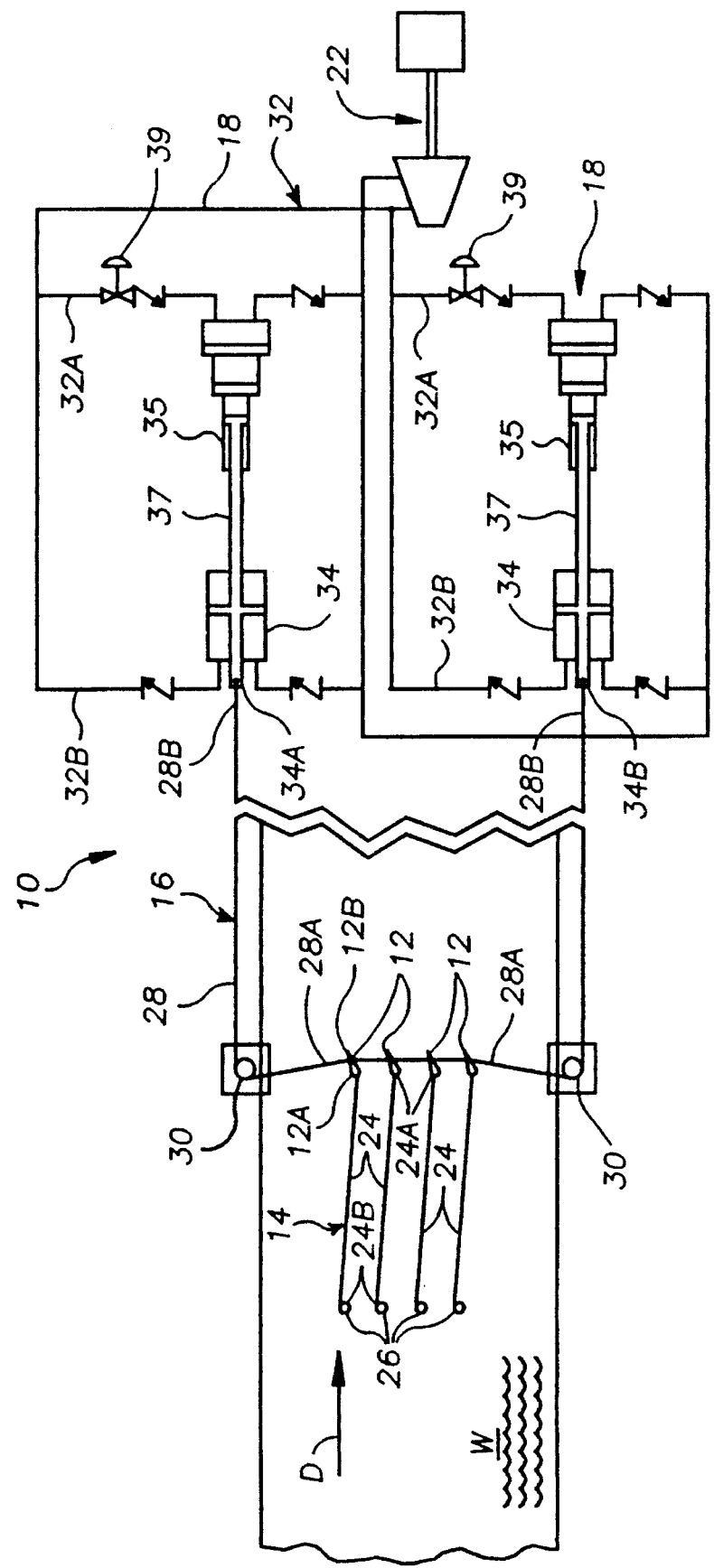
FIG. 2 is a diagram similar to that of FIG. 1 but showing a somewhat more complicated version of the reciprocating blade system now employing multiple blades and multiple load mechanisms being connected to a turbine/generator set.

The control means 14 of the system 10 applies a condition of tension to the upstream end 12A of the blade 12. The power means 16 of the system 10 extends in generally transverse relationship to the given flow direction D and in opposite directions from the blade 12. The load means 18 is operable for alternately applying conditions of tension and slack thereto so as to cause the blade 12, depending upon the orientation of the angle of attack of the blade 12 to the given flow direction D, to respond to the moving body of water W and undergo lateral movement through one of a pair of opposite directions R, L (see FIG. 9) along an oscillatory path P (see FIG. 9 also) extending in generally transverse relationship to the given flow direction D and thereby extract energy from the moving body of water W. The load means 18 also is operable to cause the blade 12 upon reaching the respective opposite ends of the oscillatory path P to reverse the orientation of the angle of attack of the blade 12 relative to the given flow direction so that the blade 12 will then respond to the moving body of water and initiate movement in the opposite direction along the oscillatory path. Optionally, as seen in FIG. 2, the load means 18 can also be connected to the control means 14 to control the condition of tension in the control means as a function of the position of the blade 12 along its oscillatory path P.

Also, the load means 18 is adapted to operate through a working cycle in response to lateral movement of the blade 12 through its oscillatory path P. The load means 18 is adapted to be coupled to an external energy conversion mechanism 22, such as a turbine-generator set, which is adapted to operate through a well-known energy conversion cycle per se in response to operation of the load means 18 through the working cycle. The load means 18 also is adapted to do other useful work such as pumping water, hydrocarbons, air or some other fluid. With respect to the energy conversion mechanism 22, the lateral movement of the blade 12 causes the load means 18 in conjunction with the energy conversion mechanism 22 to convert the extracted energy to a more useful form of energy, such as electricity in the case where the external energy conversion mechanism 22 is the turbine-generator set.

In the simplified version of the reciprocating blade system 10 depicted in FIG. 1, the system 10 employs a single blade 12. The control means 14 is a single elongated control cable 24 attached at a first end 24A to the upstream end 12A of the blade 12 and extending upstream therefrom with reference to the given flow direction. The control cable 24 may be an inelastic flexible member. Also, the cable 24 can be a partially or wholly rigid member which, unlike a flexible round cable, could be shaped to minimize friction. The control means 14 may also be constructed of a flexible yet essentially rigid material, such as nylon, carbon fibers in a plastic matrix, etc. Thus, the control means 14 may be a rigid or flexible member primarily in tension. This tension minimizes structural requirments of the mechanism and is thus a key feature of the present invention.

In some applications, the control means 14 also includes a stationary structure 26 spaced upstream from the blade 12, with the control cable 24 at a second end 24B opposite from the first end 24A thereof being attached to the stationary structure 26. Thus, the control cable 24 extends from the stationary structure 26 to the upstream end 12A of the blade 12 and applies the condition of tension from the stationary structure 26 through the control cable 24 to the upstream end 12A of the blade 12.

The power means 16 of the system 10 includes a pair of elongated inelastic flexible power cables 28 for transmitting conditions of tension and slack, each having a first end 28A attached to the downstream end 12B of the blade 12 and extending in generally transverse relationship to the given flow direction D and in opposite directions from the blade 12 to second ends 28B opposite from the first ends 28A thereof which are connected to the load means 18. The power means 16 may also includes a pair of pulleys 30 mounted at stationary locations (such as on banks bounding or stationary structures in the flowing body of water W) spaced in opposite directions from the blade 12 and disposed between the blade 12 and the load means 18. Each of the pulleys 30 has a respective one of the power cables 28 received and entrained at least partially thereabout and extending therefrom to the load means 18.

The load means 18 of the system 10 includes at least one hydraulic circuit 32 having a pair of circuit portions 32A, 32B. The one circuit portion 32A provides an output for delivering a pressurized flow of fluid from the circuit 32 to the external energy conversion mechanism 22, such as the turbine-generator set, whereas the other circuit portion 32B provides an input for returning a pressurized flow of fluid from the external energy conversion mechanism 22 back to the circuit 32. The load means 18 also includes a hydraulic actuator 34 reciprocally movable through a working cycle and being connected to the hydraulic circuit 32. The hydraulic actuator 34 has opposite ends 34A, 34B connected to the second ends 28B of the power cables 28. The hydraulic actuator 34 operates to alternately apply conditions of tension and slack to the respective power cables 28 which are thereby transmitted to the blade 12 as the hydraulic actuator 34 in turn is reciprocally moved through its working cycle as a result of the lateral movement of the blade 12 along its oscillatory path P.

The load means 18 also may be connected to the control means 14 to control the condition of tension in the control means 14 as a function of the position of the blade 12 along its oscillatory path. Specifically, as seen in FIG. 2, a hydraulic actuator 31 is connected to the end 24B of the control cable 24. The pressure in the hydraulic actuator 31 is controlled by operation of a control valve 33 through automatic control means (not shown) to control the condition of tension in the control cable 24 as a function of the position of the blade 12 along its oscillatory path.

The main differences between the simplified version of the reciprocating blade system 10 of FIG. 1 and the more complicated version of FIG. 2 is that the latter employs multiple blades 12 and multiple load meams 18 being together connected in parallel with one another and in series to the turbine-generator set 22. Also, in FIG. 2, each load means 18 of the system 10 includes variable area piston 35 connected by a rigid shaft 37 to the hydraulic actuator 34. By presenting a variable area throughout its stroke, the variable area piston 35 will impart a variable tension to the power cables 28 which is a function of the position of the blade 12 in its oscillatory path. Also, the pressure in the hydraulic actuator 34 may be controlled by operation of a control valve 39 through automatic control means (not shown) to control the condition of tension in the power cable 28 as a function of the position of the blade 12 along its oscillatory path. In most other respects, the respective operations performed by the two versions of the reciprocating blade system 10 are substantially the same.

Referring now to FIG. 3 and 4, there is illustrated one example of a construction of the blade 12 of the system 10. The illustrated blade 12 includes an upright extending blade member 36 having respective upper and lower portions 36A, 36B. Each of the upper and lower portions 36A, 36B has upper and lower parts being reversely canted relative to a vertical reference. The canting allows the blade 12 to perform in a stable manner. Since over time the water level may vary from covering a portion of the blade 12 to the entire blade, the overall canting of the blade is configured to counteract buoyance forces which change as the water level changes. In addition, each of the upper and lower portions 36A, 36B have swept configurations providing a V pattern similar to aircraft wings which stabilizes the blade 12 in flight.

The blade 12 also includes one or more rudder members 38 each attached to and extending downstream from a respective one of the upper and lower portions 36A, 36B of the blade member 36 at upper and lower locations thereon substantially equally spaced in opposite directions from a midpoint 36C on the blade member 36 being located equidistantly from opposite upper and lower ends of the blade member 36. The rudder members 38 provide stability in flight also.

Instead of a single control cable 24, the control means may take the form of two or more elongated inelastic flexible control cables 24 attached at the first ends 24A thereof to the upper and lower locations opposite to the rudder members 38 on the blade member 36. Further, the control means 14 may also includes a plurality of protective shrouds 42 each extending along opposite sides of and surrounding one of the control cables 24.

Referring to FIGS. 5–7, by way of example, the control and power cables 14, 16 are attached to the respective upstream and downstream ends 12A, 12B of the blade 12 by an attachment wherein the respective end of each cable 14, 16 is anchored in an inner slot 44 and extends through an outer V-shaped groove 46 which accommodates a smooth hinging action between the respective ends of the cables 14, 16 and the blade 12.

Referring to FIGS. 8A–8F, there is shown a series of diagrams showing a sequence of positions of the blade 12 as the blade reverses direction of movement at one of the opposite ends E of its oscillatory path P. FIG. 9 is a diagram of arrows tracing the aerodynamic center of the blade 12 along the oscillatory path P. FIG. 8A shows the blade 12 in a power stroke moving toward a stall point near the end of the stroke. FIG. 8B shows the blade 12 continuing toward the end of the same power stroke shown in FIG. 8A. FIG. 8C shows reversal of the tension and slack conditions between control cables 28X and 28Y such that blade 12 has stopped moving toward the stall point and is now rotating about point C due to tension in control cable 28X. FIG. 8D shows the blade 12 continuing to rotate about the point C, preparing for a reversal of its angle of attack. FIG. 8E shows the blade 12 fully rotated about point C with its angle of attack fully reversed and with blade 12 now translating toward the stall point located near the other end of the oscillatory path from that shown in FIG. 8A. FIG. 8F shows the blade 12 moving in a reverse power stroke toward the opposite stall point.

Figure 10A:
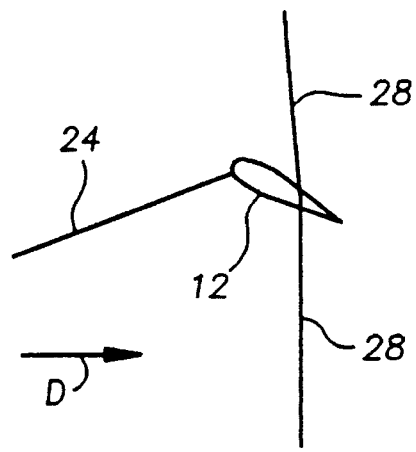
FIGS. 10A through 10E are several diagrams of different rigging options for the blade in the reciprocating blade system.
Figure 10B:
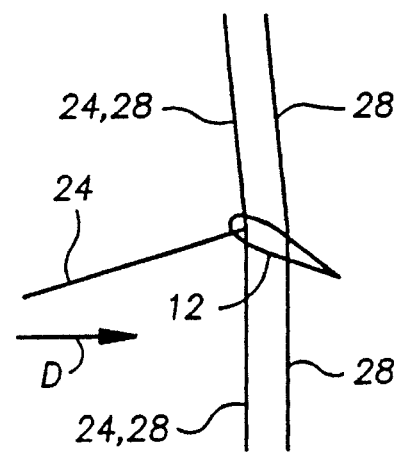
Figure 10C:
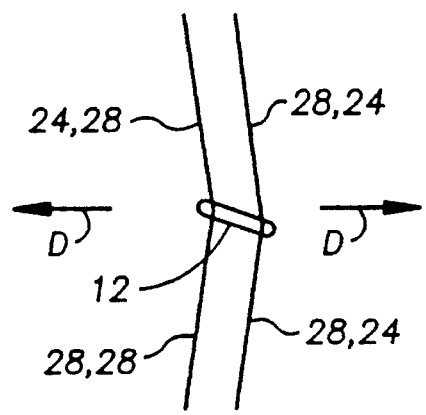
Figure 10D:
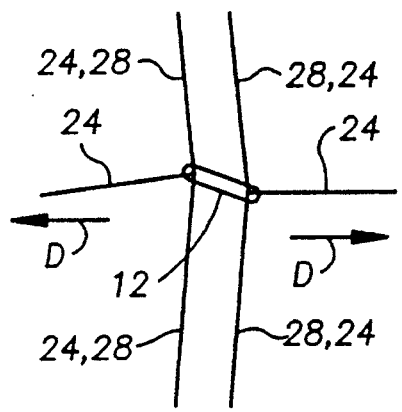
Figure 10E:
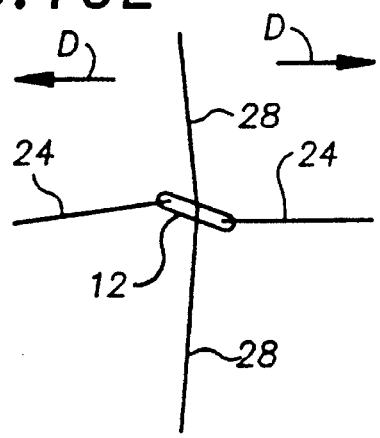

Finally, FIGS. 10A–10E are diagrams illustrating the different rigging options for the blade 12 and control and power cables 24, 28 in the reciprocating blade system 10 of the present invention. FIGS. 10A and 10B illustrate rigging options for use in river flows for converting energy from water flow in only one direction. FIGS. 10C through 10E illustrate rigging options for use in tidal flows for converting energy from water flows in opposite directions.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A reciprocating blade system for energy extraction from a moving body of water, said system comprising:

(a) at least one blade for placement in a moving body of water flowing in a given flow direction, said blade having a hydrofoil configuration capable of being oriented at an angle of attack relative to the given flow direction to cause said blade to undergo lateral movement in response to contact with the moving body of water;

(b) control means attached to an upstream end of said blade with reference to the given flow direction for applying a condition of tension thereto;

(c) power means for transmitting conditions of tension and slack, said power means being attached to a downstream end of said blade with reference to the given flow direction and extending in generally transverse relationship to the given flow direction and in opposite directions from said blade; and (d) load means attached to said power means and being operable for alternately applying conditions of tension and slack through said power means to said blade so as to cause said blade, depending upon the orientation of said angle of attack of said blade to the given flow direction, to respond to the moving body of water and undergo lateral movement through one at a time of a pair of opposite directions along an oscillatory path extending in generally transverse relationship to the given flow direction and thereby extract energy from the moving body of water, said load means also operable to cause said blade upon reaching respective opposite ends of the oscillatory path to reverse the orientation of the angle of attack of said blade relative to the given flow direction so that said blade will then respond to the moving body of water and initiate movement in the opposite direction along the oscillatory path.

2. The system of claim 1 wherein said blade includes an upright extending blade member having respective upper and lower portions, each of said upper and lower portions having upper and lower parts being reversely canted relative to the vertical.

3. The system of claim 1 wherein said blade includes:

an upright blade member having respective upper and lower portions; and a plurality of rudder members each attached to and extending downstream from a respective one of said upper and lower portions of said blade member at upper and lower locations thereon substantially equally spaced in opposite directions from a midpoint on said blade member located being equidistantly from opposite upper and lower ends of said blade member.

4. The system of claim 3 wherein said control means includes a plurality of control cables attached at first ends to said upper and lower locations on said upstream end of said blade member and extending upstream therefrom with reference to the given flow direction.

5. The system of claim 4 wherein said control means also includes a plurality of shrouds each extending along opposite sides of and surrounding one of said control cables.

6. The system of claim 1 wherein said control means includes an elongated control cable attached at a first end to said upstream end of said blade and extending upstream therefrom with reference to the given flow direction.

7. The system of claim 6 wherein said control means also includes a stationary structure spaced upstream from said blade, said control cable at a second end opposite from said first end being attached to said stationary structure and extending therefrom to said upstream end of said blade for applying the condition of tension from said stationary structure through said control cable to said upstream end of said blade.

8. The system of claim 1 wherein said power means includes a pair of elongated power cables each having a first end attached to said downstream end of said blade and extending in generally transverse relationship to the given direction and in opposite directions from said blade to second ends opposite from said first ends of said power cables.

9. The system of claim 8 wherein said power means also includes a plurality of pulleys mounted at stationary locations spaced in opposite directions from said blade and disposed between said blade and said load means, each of said pulleys having a respective one of said power cables received and entrained at least partially thereabout.

10. The system of claim 1 wherein said load means includes at least one hydraulic circuit having a pair of circuit portions, one of said circuit portions providing an output for delivering a pressurized flow of fluid from the circuit to an external energy conversion mechanism, the other of said circuit portions providing an input for returning a pressurized flow of fluid from the external energy conversion mechanism back to said circuit.

11. The system of claim 10 wherein said load means also includes a hydraulic actuator reciprocally movable through a working cycle and being connected to said hydraulic circuit, said hydraulic actuator having opposite ends connected to said power means and being operable for alternately applying conditions of tension and slack thereto as said hydraulic actuator is reciprocally moved through said working cycle by said lateral movement of said blade along the oscillatory path.

12. The system of claim 1 wherein said said load means is adapted to operate through a working cycle and to be coupled to an external energy conversion mechanism which is adapted to operate through an energy conversion cycle in response to operation of said load means through said working cycle such that lateral movement of said blade causes said load means in conjunction with the energy conversion mechanism to convert the extracted energy to another form of energy.

13. The system of claim 1 wherein said load means also is connected to said control means to control the condition of tension in said control means as a function of the position of said blade along its oscillatory path.

14. The system of claim 13 further comprising:

at least one pulley mounted at stationary location between said blade and said load means and adapted to receive and entrain said control means at least partially thereabout and extending therefrom to said load means.

15. The system of claim 1 wherein said load means also is connected to said power means to control the condition of tension in said power means as a function of the position of said blade along its oscillatory path.

16. A reciprocating blade system for energy extraction from a moving body of water, said system comprising:

(a) at least one blade for placement in a moving body of water flowing in a given flow direction, said blade having a hydrofoil configuration capable of being oriented at an angle of attack relative to the given flow direction to cause said blade to undergo lateral movement in response to contact with the moving body of water;

(b) an elongated control cable attached at a first end to an upstream end of said blade with reference to the given flow direction;

(c) a stationary structure spaced upstream from said blade, said control cable at a second end opposite from said first end being attached to said stationary structure and extending therefrom to said upstream end of said blade for applying a condition of tension from said stationary structure through said control cable to said upstream end of said blade;

(d) a pair of elongated power cables for transmitting conditions of tension and slack, each said power cable having a first end attached to said downstream end of said blade and extending in generally transverse relationship to the given direction and in opposite directions from said blade to second ends opposite from said first ends of said power cables; and (e) load means attached to said second ends of said power cables and being operable for alternately applying conditions of tension and slack through said power cables to said blade so as to cause said blade, depending upon the orientation of said angle of attack of said blade to the given flow direction, to respond to the moving body of water and undergo lateral movement through one at a time of a pair of opposite directions along an oscillatory path extending in generally transverse relationship to the given flow direction and thereby extract energy from the moving body of water, said load means also operable to cause said blade upon reaching respective opposite ends of the oscillatory path to reverse the orientation of the angle of attack of said blade relative to the given flow direction so that said blade will then respond to the moving body of water and initiate movement in the opposite direction along the oscillatory path.

17. The system of claim 16 wherein said blade include:

an upright blade member having respective upper and lower portions; and a plurality of rudder members each attached to and extending downstream from a respective one of said upper and lower portions of said blade member at upper and lower locations thereon substantially equally spaced in opposite directions from a midpoint on said blade member located being equidistantly from opposite upper and lower ends of said blade member.

18. The system of claim 16 further comprising:

a shroud extending along opposite sides of and surrounding said control cable.

19. The system of claim 16 further comprising:

a plurality of pulleys mounted at stationary locations spaced in opposite directions from said blade and disposed between said blade and said load means, each of said pulleys having a respective one of said power cables received and entrained at least partially thereabout and extending therefrom to said load means.

20. The system of claim 16 wherein said load means includes at least one hydraulic circuit having a pair of circuit portions, one of said circuit portions providing an output for delivering a pressurized flow of fluid from the circuit to an external energy conversion mechanism, the other of said circuit portions providing an input for returning a pressurized flow of fluid from the external energy conversion mechanism back to said circuit.

21. The system of claim 20 wherein said load means also includes a hydraulic actuator reciprocally movable through a working cycle and being connected to said hydraulic circuit, said hydraulic actuator having opposite ends connected to said power means and being operable for alternately applying conditions of tension and slack thereto as said hydraulic actuator is reciprocally moved through said working cycle by said lateral movement of said blade along the oscillatory path.

22. A reciprocating blade system for energy extraction from a moving body of water, said system comprising:

(a) a plurality of blades for placement in a laterally spaced apart relationship to one another in a moving body of water flowing in a given flow direction, each of said blades having a hydrofoil configuration capable of being oriented at an angle of attack relative to the given flow direction to cause said each blade to undergo lateral movement in response to contact with the moving body of water;

(b) a plurality of elongated inelastic flexible control cables each attached at a first end to an upstream end of one of said blades with reference to the given flow direction;

(c) a stationary structure spaced upstream from said blades, said control cables at second ends opposite from said first ends thereof being attached to said stationary structure and extending therefrom to said respective upstream ends of said blades for applying a condition of tension from said stationary structure through said control cables to said upstream ends of said blades;

(d) power means for transmitting conditions of tension and slack, said power means being attached to downstream ends of said blades with reference to the given flow direction and extending in generally transverse relationship to the given flow direction and in opposite directions from said blades; and (e) load means attached to said power means and being operable for alternately applying conditions of tension and slack through said power means to said blades so as to cause said blades, depending upon the orientation of said angle of attack of each of said blades to the given flow direction, to respond to the moving body of water and undergo lateral movement through one at a time of a pair of opposite directions along an oscillatory path extending in generally transverse relationship to the given flow direction and thereby extract energy from the moving body of water, said load means also operable to cause said blade upon reaching respective opposite ends of the oscillatory path to reverse the orientation of the angle of attack of said blade relative to the given flow direction so that said blade will then respond to the moving body of water and initiate movement in the opposite direction along the oscillatory path.

23. The system of claim 22 wherein said load means includes:

at least one hydraulic circuit having a pair of circuit portions, one of said circuit portions providing an output for delivering a pressurized flow of fluid from the circuit to an external energy conversion mechanism, the other of said circuit portions providing an input for returning a pressurized flow of fluid from the external energy conversion mechanism back to said circuit; and at least one hydraulic actuator reciprocally movable through a working cycle and being connected to said hydraulic circuit, said hydraulic actuator having opposite ends connected to said power means and being operable for alternately applying conditions of tension and slack thereto as said hydraulic actuator is reciprocally moved through said working cycle by said lateral movement of said blade along the oscillatory path.

* * * * *